United States Patent
Generale et al.

(10) Patent No.: US 11,162,368 B2
(45) Date of Patent: Nov. 2, 2021

(54) AIRFOIL ASSEMBLY WITH CERAMIC AIRFOIL PIECES AND SEAL

(71) Applicant: United Technologies Corporation, Farmington, CT (US)

(72) Inventors: Adam P. Generale, Dobbs Ferry, NY (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 12 days.

(21) Appl. No.: 16/440,217

(22) Filed: Jun. 13, 2019

(65) Prior Publication Data
US 2020/0392851 A1    Dec. 17, 2020

(51) Int. Cl.
| F01D 5/18 | (2006.01) |
| B64D 27/10 | (2006.01) |
| F01D 5/14 | (2006.01) |
| F01D 5/28 | (2006.01) |
| F02K 3/02 | (2006.01) |

(52) U.S. Cl.
CPC .............. *F01D 5/18* (2013.01); *B64D 27/10* (2013.01); *F01D 5/14* (2013.01); *F01D 5/284* (2013.01); *F02K 3/025* (2013.01); *F05D 2220/323* (2013.01); *F05D 2240/30* (2013.01); *F05D 2300/20* (2013.01)

(58) Field of Classification Search
CPC .......... F01D 5/18; F01D 11/005; F01D 9/042; F01D 5/14; F01D 11/00; B64D 27/10
See application file for complete search history.

(56) References Cited

U.S. PATENT DOCUMENTS

| 4,455,122 | A | * | 6/1984 | Schwarzmann | ........... F01D 5/26 416/190 |
| 8,714,565 | B1 | | 5/2014 | Cornett et al. | |
| 9,546,557 | B2 | | 1/2017 | Grooms, III et al. | |
| 10,233,764 | B2 | | 3/2019 | Thomas et al. | |
| 2017/0022833 | A1 | | 1/2017 | Heitman et al. | |
| 2020/0040750 | A1 | * | 2/2020 | Greene | ................. F01D 11/005 |
| 2020/0080429 | A1 | * | 3/2020 | Vetters | ................. F01D 25/005 |

FOREIGN PATENT DOCUMENTS

| EP | 3159484 | 4/2017 |
| EP | 3214276 | 9/2017 |
| WO | 2015156889 | 10/2015 |

OTHER PUBLICATIONS

European Search Report for European Patent Application No. 20178998.9 completed Aug. 28, 2020.

* cited by examiner

*Primary Examiner* — Michael L Sehn
(74) *Attorney, Agent, or Firm* — Carlson, Gaskey & Olds, P.C.

(57) ABSTRACT

An airfoil assembly includes first and second ceramic airfoil pieces that each have first and second platforms and a hollow airfoil section that connects the first and second platforms. First and second spars extend through, respectively, the hollow airfoil sections. A seal has a seal body that defines at least one orifice and a seal portion. The first spar extends through one of the at least one orifices and the seal portion bridges a mate face between the first platforms of the first and second ceramic airfoil pieces.

19 Claims, 6 Drawing Sheets

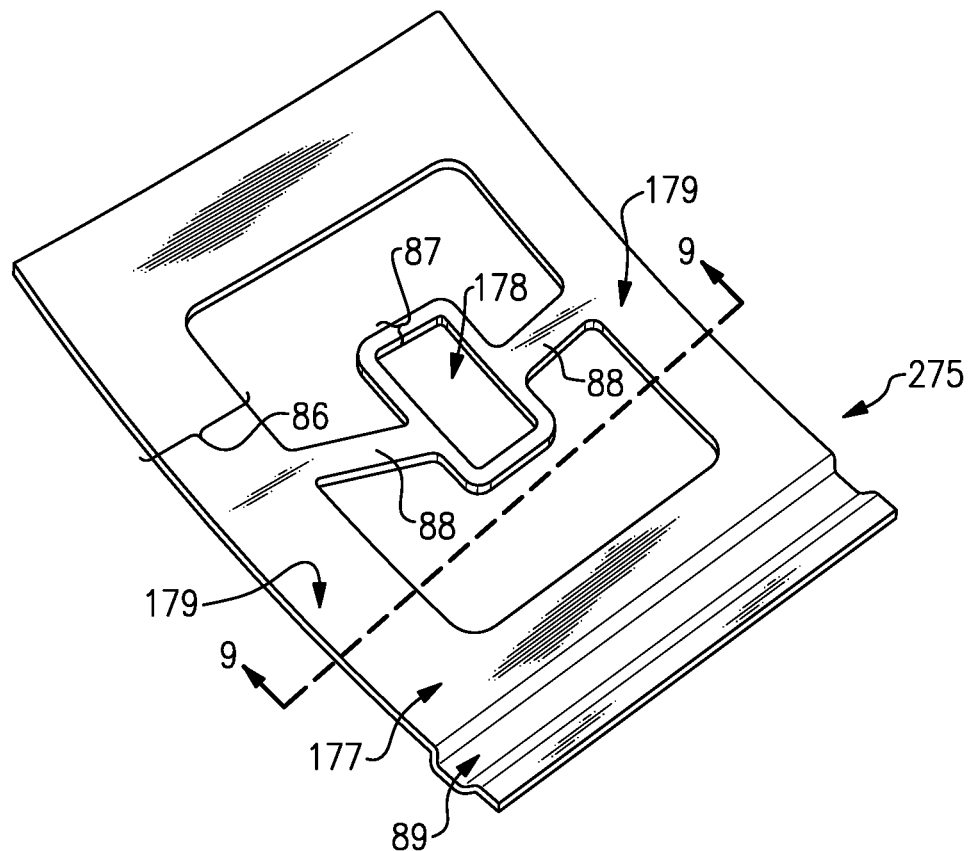
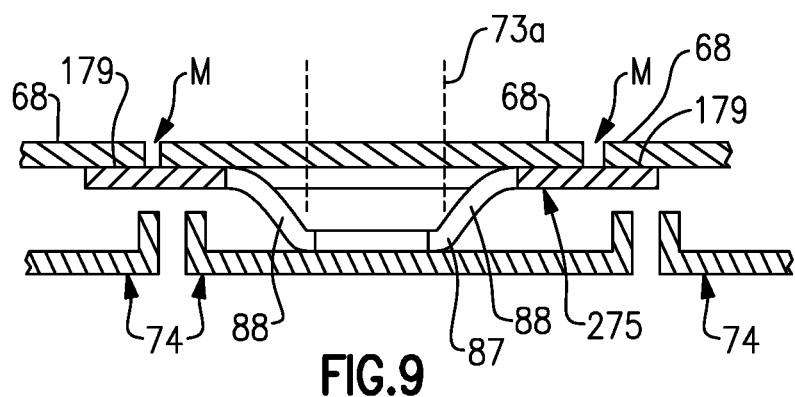

AIRFOIL ASSEMBLY WITH CERAMIC AIRFOIL PIECES AND SEAL

BACKGROUND

Gas turbine engines typically include a compressor, a combustor, and a turbine. Airfoils in the turbine are subjected to high temperature gases that exit from the combustor. The airfoils are typically formed of a superalloy that is coated with a ceramic thermal barrier coating. Alternatively, rather than the superalloy, some airfoils may be formed of ceramic, such as a ceramic matrix composite. Because of the difference in material properties, ceramic airfoils require a different design than superalloy airfoils.

SUMMARY

An airfoil assembly according to an example of the present disclosure includes first and second ceramic airfoil pieces that each have first and second platforms, a hollow airfoil section connecting the first and second platforms, first and second spars extending through, respectively, the hollow airfoil sections, and a seal having a seal body defining at least one orifice and a seal portion. The first spar extends through one of the at least one orifices and the seal portion bridges a mate face between the first platforms of the first and second ceramic airfoil pieces.

In a further embodiment of any of the foregoing embodiments, the seal is metal.

In a further embodiment of any of the foregoing embodiments, the seal is formed of sheet metal.

In a further embodiment of any of the foregoing embodiments, the hollow airfoil section defines a longitudinal direction between inner and outer ends, and the seal portion is longitudinally offset from the at least one orifice.

In a further embodiment of any of the foregoing embodiments, the seal portion terminates short of a leading edge and a trailing edge of the first platform.

In a further embodiment of any of the foregoing embodiments, the at least one orifice includes first and second orifices, and the seal portion is between the first and second orifices.

In a further embodiment of any of the foregoing embodiments, the first spar extends through the first orifice and the second spar extends through the second orifice.

A further embodiment of any of the foregoing embodiments includes a second seal that includes another seal body, another orifice, and another seal portion. The second spar extends through the orifice of the second seal, and the second seal partially overlaps the seal through which the first spar extends.

In a further embodiment of any of the foregoing embodiments, the seal body defines a first, outer ring, a second, inner ring, and at least one spoke connecting the first ring and the second ring. The orifice is in the second ring and the seal portion is on the first ring.

In a further embodiment of any of the foregoing embodiments, the hollow airfoil section defines a longitudinal direction between inner and outer ends, and the first ring is longitudinally offset from the second ring.

In a further embodiment of any of the foregoing embodiments, the first ring defines a channel.

A gas turbine engine according to an example of the present disclosure includes a turbine section that has an airfoil assembly according to any of the foregoing embodiments.

A seal for an airfoil assembly according to an example of the present disclosure includes a seal body formed of sheet metal. The body defines at least one orifice configured to receive a spar there through and a seal portion configured to bridge a mate face between adjacent platforms.

In a further embodiment of any of the foregoing embodiments, the seal portion is offset from the at least one orifice.

In a further embodiment of any of the foregoing embodiments, the at least one orifice includes first and second orifices, and the seal portion is between the first and second orifices.

In a further embodiment of any of the foregoing embodiments, the seal body defines a first, outer ring, a second, inner ring, and at least one spoke connecting the first ring and the second ring. The at least one orifice is in the second ring and the seal portion is on the first ring.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 8 illustrates an isolated view of another example seal of the airfoil assembly.

FIG. 9 illustrates a sectioned view of the seal of FIG. 8.

DETAILED DESCRIPTION

Figure 1:
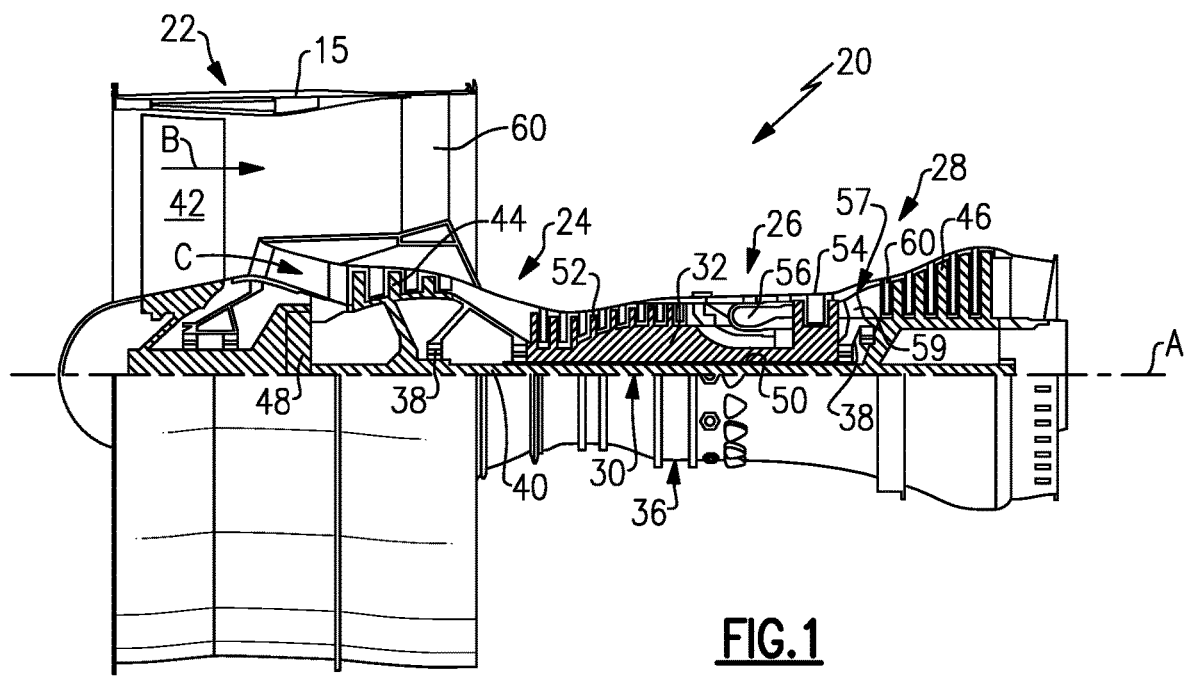
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R.)/(518.7° R.)]^0.5. The "Low corrected fan tip speed" as disclosed herein according to one non-limiting embodiment is less than about 1150ft/second (350.5 meters/second).

Figure 2:
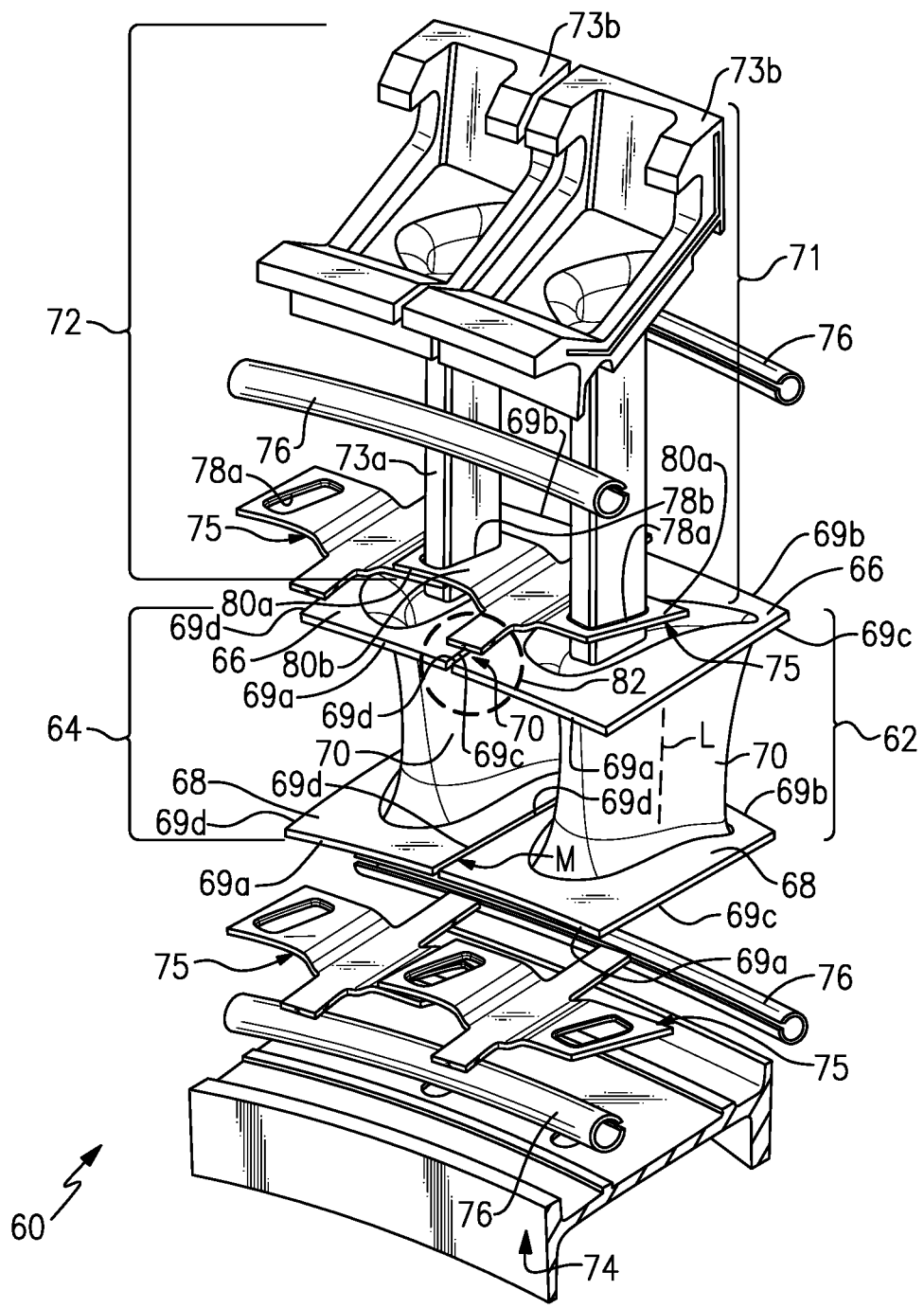
FIG. 2 illustrates an expanded view of an airfoil assembly of the gas turbine engine.
Figure 3:
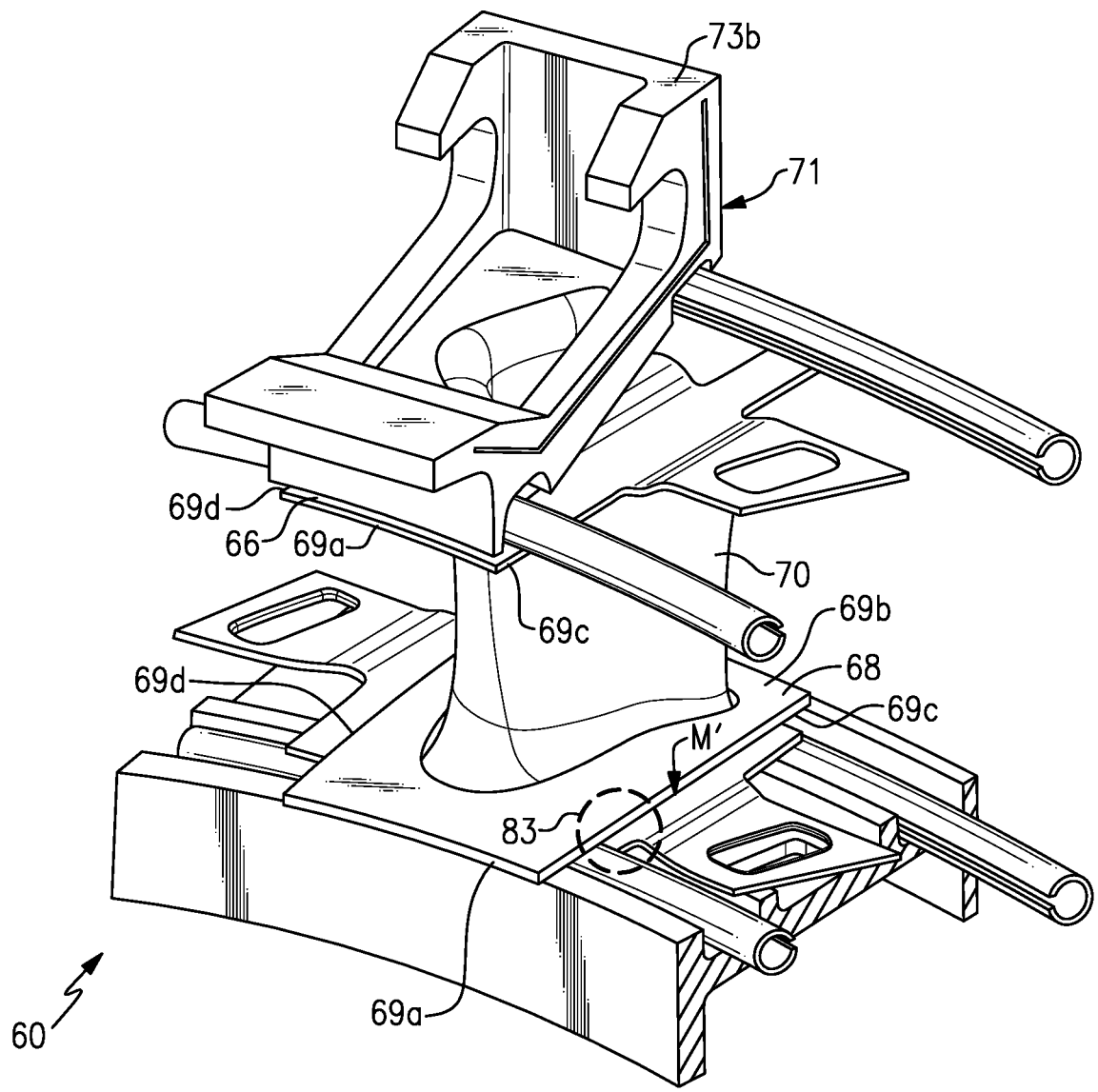
FIG. 3 illustrates a partial cutaway view of the airfoil assembly of FIG. 2.

The engine 20 also includes a plurality of airfoil assemblies 60, a representative one of which is shown in an expanded view in FIG. 2 and in a partial cutaway view in FIG. 3. In this example, the airfoil assemblies 60 are vanes in the turbine section 28, such as first stage vanes in the high pressure turbine 54. As will be appreciated, a plurality of like assemblies 60 are arranged circumferentially to form a row of airfoil vanes in the turbine section 28.

The airfoil assembly 60 includes first and second ceramic airfoil pieces 62/64. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

Each airfoil piece 62/64 includes first and second platforms or ends 66/68 and a hollow airfoil section 70 that connects the platforms 66/68. The airfoil section 70 extends along a longitudinal direction (L) between the platforms 66/68, which is also approximately perpendicular (i.e., the radial direction) to the engine axis A. In this example, the airfoil pieces 62/64 are monolithic pieces that are formed exclusively of a high temperature material, such as a ceramic matrix composite. Example ceramic matrix composites can include, but are not limited to, silicon carbide matrix with silicon carbide fibers disposed in the matrix or oxide matrix with oxide fibers disposed in the matrix.

Each platform 66/68 defines forward and trailing edges 69a/69b and circumferential edges 69c/69d. In the assembly 60, the platforms 66/68 are adjacent such that the circumferential edges 69c of platforms 66/68 of airfoil piece 62 form mate faces M with the circumferential edges 69d of the adjacent platforms 66/68 of airfoil piece 64. The mate faces M constitute the interface along which the edges 69c/69d meet or are in close proximity The airfoil assembly 60 further includes first and second spars 71/72. Each spar 71/72 includes a hollow tube portion 73a and an attachment section 73b. For instance, the attachment section 73b includes hooks for attaching the spars 71/72 to a surrounding case structure in the turbine section 28, but other types of fastening features may alternatively be used. In this example, the spars 71/72 are monolithic pieces that are formed exclusively of a metallic material. Example metallic materials can include, but are not limited to, nickel- or cobalt-based superalloys.

The hollow tube portions 73a of the spars 71/72 extend through the hollow airfoil sections 70 and connect to an inner support structure 74. For instance, as depicted, the inner support structure 74 is a full hoop structure, however, the structure 74 may alternatively be a segmented structure. In the illustrated arrangement, the spars 71/72 provide structural strength, while the ceramic airfoil pieces 62/64 provide resistance to high temperatures.

Figure 4:
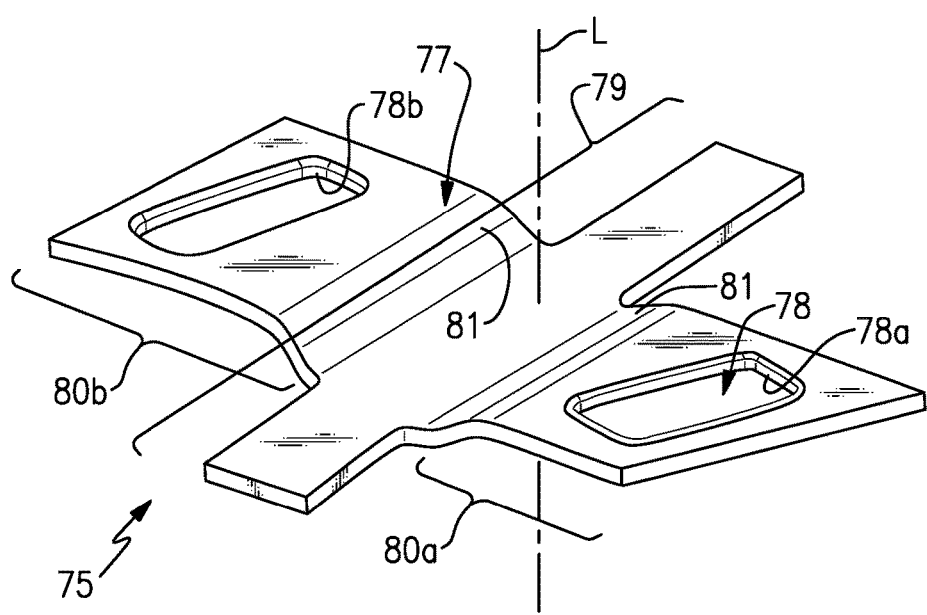
FIG. 4 illustrates an isolated view of a seal of the airfoil assembly.

There may be a gap at the mate faces M or at other component interfaces, through which bleed air used to cool the assemblies 60 can escape. In this regard, the airfoil assembly 60 additionally includes one or more seals 75 and one or more c-seals 76, although in a further embodiment the c-seals 76 are excluded. An isolated view of a representative one of the seals 75 is shown in FIG. 4. The seal 75 constitutes a seal body 77. For instance, the seal body 77 is formed of sheet metal, such as but not limited to, nickel- or cobalt-based superalloy sheet metal. The seal body 77 defines at least one orifice 78 and a seal portion 79.

In the illustrated example, the seal body 77 includes a first ear 80*a* that projects off of one elongated side of the seal portion 79 and a second ear 80*b* that projects off of the opposite elongated side of the seal portion 79. In this example, the seal body 77 defines two such orifices 78, including a first orifice 78*a* in the first ear 80*a* and a second orifice 78*b* in the second ear 80*b*. The seal portion 79 is located between the ears 80*a*/80*b*, and thus also between the orifices 78*a*/78*b*. In this example, the seal portion 79 is an elongated strip or band. In one embodiment, the band is of uniform width along its length forward and aft of the ears 80*a*/80*b*.

In the orientation in the engine 20, the seal portion 78 is circumferentially between the orifices 78*a*/78*b*. For reasons that will become evident below, each ear 80*a*/80*b* includes a sloped wall 81 such that the ears 80*a*/80*b*, and thus the orifices 78*a*/78*b*, are radially (longitudinally) offset from the seal portion 79.

Each orifice 78*a*/78*b* is configured to receive the respective spars 71/72. In this regard, the orifices 78*a*/78*b* each have a cross-sectional geometry that tracks the cross-sectional geometry of the external wall of the hollow tube portions 73*a* but is slightly larger so that the tube portions 73*a* can fit through. As shown in FIG. 2, the assembly 60 includes four such seals 75, including a pair of the seals 75 at the first or outer platforms 66 and another pair of the seals 75 at the second or inner platforms 68. In each pair of seals 75 one of the seals 75 partially overlaps the other of the seals 75, i.e., the seals 75 are "shingled." The partial overlap is a result of both seals 75 in the pair receiving the same tube portion 73*a* through one of their orifices 78. For instance, in FIG. 2, the first, or top, seal 75 (on the right-hand side of the figure) receives the left tube portion 73*a* through its second orifice 78*b*, while the second seal 75 (on the left-hand side) receives the same tube portion 73*a* through its first orifice 78*a*. That is, the ear 80*b* of the first seal 75 overlaps the ear 80*a* of the second seal 75. Likewise, the ear 80*a* of the first seal 75 will be overlapped by the second ear 80*b* of the next seal 75 (not shown), and so on and so forth around the circumferential arrangement.

Figure 5:
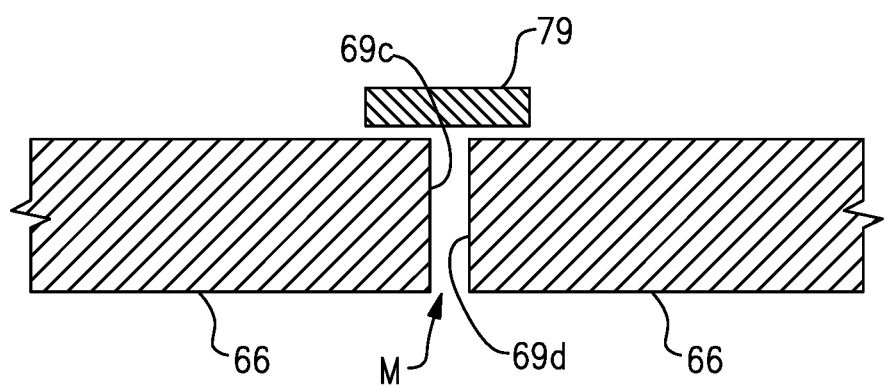
FIG. 5 illustrates a sectioned view of a seal portion bridging a mate face of adjacent platforms.

The receipt of the spars 71/72 through the orifices 78 position the seals 75 such that the seal portions 79 align with the mate faces M between the adjacent platforms 66 and the adjacent platforms 68. For instance, as shown at region 82 in FIG. 2 and also in FIG. 5, the seal portion 79 of one of the seals 75 at the first or outer platforms 66 bridges the mate face M between the platforms 66. Likewise, as shown at region 83 in FIG. 3, the seal portion 79 of one of the seals 75 at the second or inner platforms 68 bridges the mate face M (although the adjacent airfoil piece has been removed to show the seal portion 79). The seal portions 79 facilitate sealing of the mate faces M, thereby helping to limit escape of compressor bleed air provided through the spars 71/72 to cool the interior airfoil assembly 60.

Additionally, as discussed above, the seal portion 79 is longitudinally offset from the orifices 78. The offset facilitates positioning the seal portion 79 close to the mate face M to further facilitate sealing and positioning the seal portion 79 close to mate face M when the engine 20 is not running The offset may also enable the seal 75 to act as a spring, to take up differences in thermal expansion between surrounding components.

The c-seals 76 provide additional sealing. For example, the c-seals 76 are provided along the forward and trailing edges 69*a*/69*b* of the platforms 66/68. In this regard, the seal portions 79 of the seals 75 terminate short of the leading and trailing edges 69*a*/69*b* of the platforms 66/68 (an example of which is shown in FIG. 3; see also regions 82/83) such that the c-seals 76 can extend uninterrupted along the forward and trailing edges 69*a*/69*b*.

Figure 6:
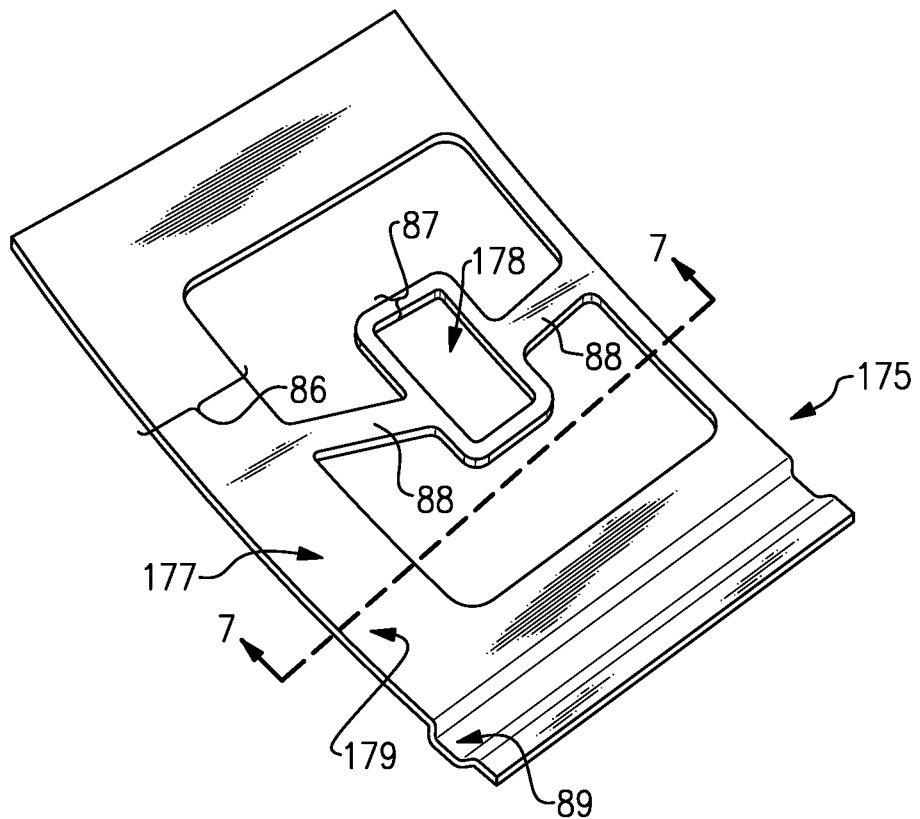
FIG. 6 illustrates an isolated view of another example seal of the airfoil assembly.
Figure 7:
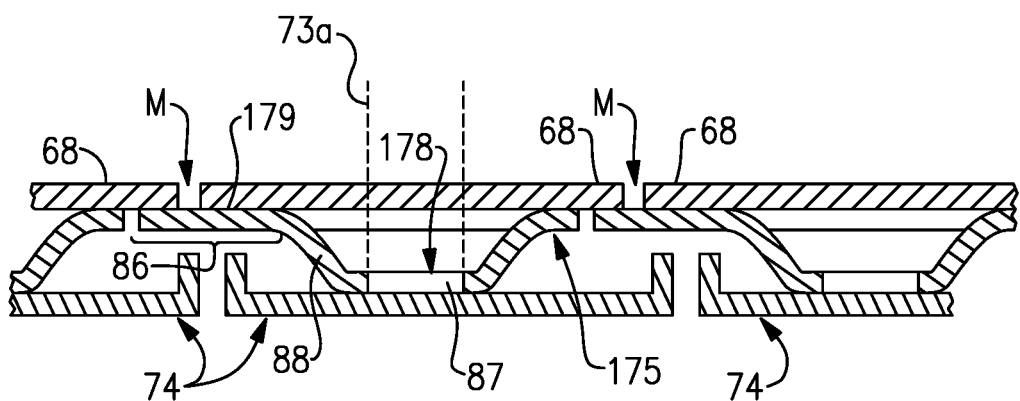
FIG. 7 illustrates a sectioned view of the seal of FIG. 6.

FIG. 6 illustrates another example seal 175 that can be used in place of seals 75, and FIG. 7 illustrates a sectioned view. In this disclosure, like reference numerals designate like elements where appropriate and reference numerals with the addition of one-hundred or multiples thereof designate modified elements that are understood to incorporate the same features and benefits of the corresponding elements. The seal 175 constitutes a seal body 177 that defines a first/outer ring 86, a second/inner ring 87, and at least one spoke 88 connecting the first ring 86 and the second ring 87. In this example, there are two spokes 88, but alternate embodiments can include a single spoke or more than two spokes.

In the example shown, the rings 86/87 are endless loops that generally have a quadrilateral cross-sectional shape. The seal 175 includes an orifice 178 in the second ring 87 and a seal portion 179 on the first ring 86. Like the sloped walls 81, the spokes 88 are sloped such that the second ring 87, and thus the orifice 178, is radially offset from the seal portion 179. The seal portion 179 constitutes one side or leg of the first ring 86, while the opposed leg/side serves for positioning of the next, adjacent seal, discussed below. Like the seal portion 79, the seal portion 179 is an elongated strip or band. In one embodiment, the band is of uniform width along a majority of its length.

The hollow tube portion 73*a* (shown schematically) of one of the struts 71/72 extends through the orifice 178. The receipt of the tube portion 73*a* through the orifice 178 positions the seal 175 such that the seal portion 179 aligns with, and bridges, the mate face M between the adjacent platforms 68 (or alternatively, the adjacent platforms 66 for an outer seal 175). Unlike the seal 75, however, adjacent seals 175 do not overlap. Rather, the seal portion 179 abuts or is in close proximity to the opposed leg/side of the first ring 86 of the next adjacent seal 175, as shown in FIG. 7. The opposed leg may thus serves as a pilot to facilitate positioning of the next, adjacent seal. Additionally, the offset between the first ring 86 and the second ring 87 facilitates positioning the seal portion 179 close to the mate face M to further facilitate sealing. The offset may also enable the seal 175 to act as a spring, to take up differences in thermal expansion between surrounding components.

As further shown in FIG. 6, at least the forward leg of the first ring 86 defines a channel 89. In the assembly 60, the channel 89 is located adjacent the leading edge 69*a* of the platform 66 or 68 and serves to facilitate sealing at the leading edge 69*a*. Likewise, the aft leg of the first ring 86 may also have a channel, for sealing at the trailing edge 69*b*. In this instance, since the channel 89 provides sealing, a c-seal may not be needed.

FIG. 8 illustrates another example seal 275. The seal 275 is similar to seal 175 except that both opposed sides or legs of the first ring 86 include seal portions 179. As shown in FIG. 9, the hollow tube portion 73*a* (shown schematically) of one of the struts extends through the orifice 178 such that the seal portions 179 align with, and bridge, the two mate faces M on either side with the adjacent platforms 68 (or alternatively, the adjacent platforms 66 for an outer seal 175). In this example, therefore, since the seal portion 179 seal two mate faces M, there is only a need to have the seal 275 on every other vane.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil assembly comprising:
   first and second ceramic airfoil pieces each having first and second platforms and a hollow airfoil section connecting the first and second platforms;
   first and second spars extending through, respectively, the hollow airfoil sections; and
   a seal having a seal body defining at least one orifice and a seal portion, the first spar extending through one of the at least one orifices and the seal portion bridging a mate face between the first platforms of the first and second ceramic airfoil pieces, wherein each of the hollow airfoil sections defines a longitudinal direction between inner and outer ends and the seal portion is longitudinally offset from the at least one orifice.

2. The airfoil assembly as recited in claim 1, wherein the seal is metal.

3. The airfoil assembly as recited in claim 2, wherein the seal is formed of sheet metal.

4. The airfoil assembly as recited in claim 1, wherein the seal portion terminates short of a leading edge and a trailing edge of the first platform.

5. The airfoil assembly as recited in claim 1, wherein the at least one orifice includes first and second orifices, and the seal portion is between the first and second orifices.

6. The airfoil assembly as recited in claim 5, wherein the first spar extends through the first orifice and the second spar extends through the second orifice.

7. The airfoil assembly as recited in claim 1, further comprising a second seal that includes another seal body, another orifice, and another seal portion, the second spar extends through the orifice of the second seal, and the second seal partially overlaps the seal through which the first spar extends.

8. The airfoil assembly as recited in claim 1, wherein the seal body defines a first, outer ring; a second, inner ring; and at least one spoke connecting the first ring and the second ring, where the at least one orifice is in the second ring and the seal portion is on the first ring.

9. The airfoil assembly as recited in claim 8, wherein the the first ring is longitudinally offset from the second ring.

10. The airfoil assembly as recited in claim 8, wherein the first ring defines a channel.

11. The airfoil assembly as recited in claim 1, wherein the seal is a first seal, and further comprising a second seal that is identical to the first seal, the at least one orifice of the first seal and the second seal includes first and second orifices, and the seal portion of the first seal and the second seal is between the first and second orifices.

12. The airfoil assembly as recited in claim 11, wherein the first spar extends through the first orifice of the first seal, the second spar extends through the second orifice of the first seal and also through the first orifice of the second seal such that the first and second seals partially overlap, and the seal portion of the first seal bridges the mate face between the first platforms of the first and second ceramic airfoil pieces.

13. The airfoil assembly as recited in claim 1, wherein the seal body defines a first, outer ring, a second, inner ring, an open annular space between the inner and outer rings, and at least one spoke extending across the open annular space and connecting the first ring and the second ring, where the at least one orifice is in the second ring and the seal portion is on the first ring.

14. The airfoil assembly as recited in claim 13, wherein the at least one spoke includes first and second spokes located across from each other on opposed sides of the inner ring.

15. The airfoil assembly as recited in claim 1, wherein the seal portion is in contact with the first platforms of the first and second ceramic airfoils.

16. A gas turbine engine comprising:
   a compressor section;
   a combustor; and
   a turbine section, the turbine section having an airfoil assembly including,
      a first and second ceramic airfoil pieces each having first and second platforms and a hollow airfoil section connecting the first and second platforms,
      first and second spars extending through, respectively, the hollow airfoil sections, and
      identical first and second seals, each of the first and second seals having a seal body defining first and second orifices and a seal portion between the first and second orifices, the first spar extending through the first orifice of the first seal, the second spar extending through the second orifice of the first seal and also through the first orifice of the second seal such that the first and second seals partially overlap, and the seal portion of the first seal bridging a mate face between the first platforms of the first and second ceramic airfoil pieces.

17. The gas turbine engine as recited in claim 16, wherein each of the hollow airfoil sections defines a longitudinal direction between inner and outer ends, and the seal portion is longitudinally offset from the at least one orifice.

18. A seal for an airfoil assembly, the seal comprising:
   a seal body formed of sheet metal and defining at least one orifice configured to receive a spar there through along a longitudinal direction and a seal portion configured to bridge a mate face between adjacent platforms, wherein the seal portion is longitudinally offset from the at least one orifice wherein the at least one orifice includes first and second orifices, and the seal portion is between the first and second orifices.

19. The seal as recited in claim 18, wherein the seal body defines a first, outer ring; a second, inner ring; and at least one spoke connecting the first ring and the second ring, where the at least one orifice is in the second ring and the seal portion is on the first ring.

* * * * *